Aug. 15, 1933.  J. JUERGENS ET AL  1,922,687
SHOCK ABSORBING SOCKET
Original Filed Sept. 17, 1923
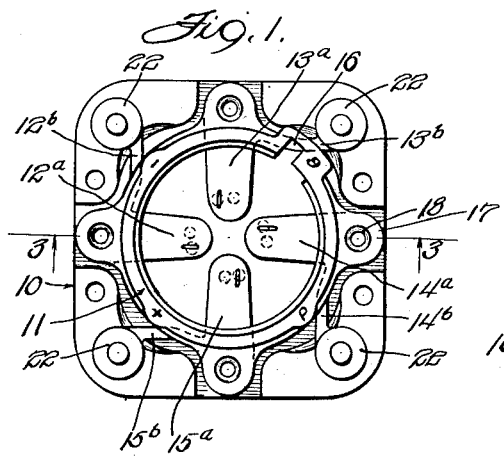
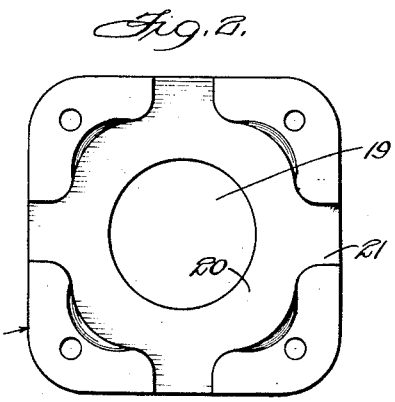
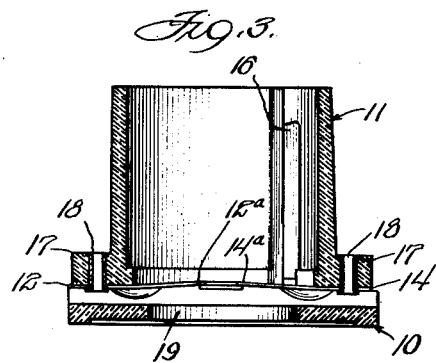
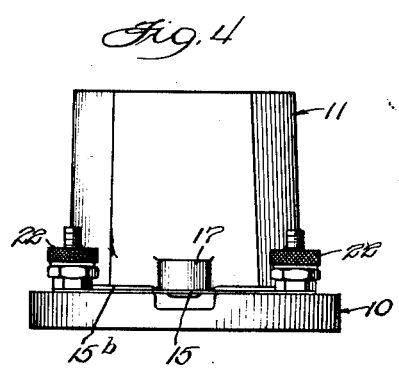
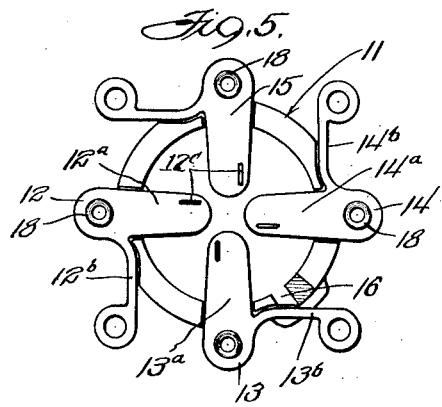
Inventors:
John Juergens
Reuben B. Benjamin
By Jones, Addington, Ames & Seibold
Attys.

Patented Aug. 15, 1933

1,922,687

UNITED STATES PATENT OFFICE 1,922,687

SHOCK ABSORBING SOCKET

John Juergens and Reuben B. Benjamin, Chicago, Ill., assignors to Benjamin Electric Manufacturing Company, Chicago, Ill., a Corporation of Illinois Original application September 17, 1923, Serial No. 663,031. Divided and this application April 27, 1926. Serial No. 104,979

1 Claim. (Cl. 173—328)

This invention relates to sockets for electrical devices, and more particularly to sockets designed to be absorptive of shocks and vibrations which may be detrimental to the proper operation and maintenance of certain electrical devices, especially those in the nature of incandescent lamps and vacuum tube rectifiers, thermionic repeaters including oscillators and amplifiers.

One of the objects of our invention is to provide a socket of the above indicated character which will be compact and rugged in construction.

A further object of our invention is to provide a shock absorbing socket of the above indicated character in which the shock absorbing, current-carrying springs are compactly arranged with respect to the rest of the construction.

A further object of our invention is to provide a shock absorbing socket of the character indicated in which the supporting springs are arranged to withstand torsional strains on the socket.

Further objects of our invention comprise the provision of an electrical socket having a small number of parts which may be economically and readily manufactured and assembled to form a socket which is very convenient and dependable in operation.

For a better understanding of the nature, scope and characteristic features of our invention, reference may be had to the following description and accompanying drawing, in which—

Figure 1 is a top or plan view of one form of socket embodying my invention;

Fig. 2 is a view similar to Fig. 1 but with the shell member and the spring shock absorbing members removed thus showing the configuration of the base member alone;

Fig. 3 is a sectional view taken upon the line 3—3 of Fig. 1, looking in the direction of the arrows;

Fig. 4 is a side elevational view of the structure shown in Fig. 1; and

Fig. 5 is a bottom view of the socket with the base 10 removed.

The structure as shown essentially comprises a base member 10, a shell member 11, and a plurality of shock-absorbing cantilever spring connecting members as at 12, 13, 14 and 15.

The shell and base members are preferably composed of any suitable insulating composition, such as hard rubber, the shell member 11 being grooved at 16 to form the usual type of bayonet joint connection with the base of the electrical device received therein. The spring connecting members lie in the same general plane and extend substantially circumferentially with respect to the shell member 11 to prevent undue strain on the springs when the shell is subjected to torsion as in inserting and removing the bulb.

The spring members may be formed with flat spring contact portions 12a, 13a, 14a and 15a, extending transversely of the cylindrical shell member 11 at the lower open end thereof. These contact portions serve to provide a connection with the usual cooperating contacts carried upon the electrical device inserted in the shell member and at the same time yieldably force the base of the electrical device upwardly into its proper relation with the bayonet joint at 16.

The shell member 11 as shown may be formed with ear portions or bosses as at 17 corresponding in number to the number of spring contact members. Each of the ear portions by the use of an eyelet as at 18 serves to retain one of the spring members to the shell portion.

As shown, each of the spring members may be provided with extensions as at 12b, 13b, 14b and 15b, which extend to and are affixed upon the base member 10. It will be noted that these extensions may be integrally stamped with the contact portions 12a, 13a, 14a and 15a, from resilient flat sheet metal. The extensions 12b are branched off from the contact portions at substantially right angles thereto and thus the space required for the assembled structure is substantially minimized. Furthermore, the four point spring support for the shell member when arranged as shown, with two of these angularly formed springs at right angles to the other two springs, provides a device with ample shock-absorbing properties but still possessing sufficient stability to properly maintain the electrical device in operating position.

The base member 10 may be provided as shown with a central opening 19 which provides space for the proper movement of the contact members and also serves as an aperture through which the condition of the contacts may be observed. The base member also may be formed with a central annular recess 20 surrounding the aperture 19 for further providing for the free movement of the spring members. Additional recesses as at 21, communicating with the recess 20 may be formed beneath each of the ear portions 17.

With the recessed base member as shown, the shell member 11 may thus be freely supported by the spring members and at the same time be separated for an appreciable distance at all points from the base member. Accordingly, any vibrations or shocks imparted to the base member may be transmitted to the shell member only by way of the spring supports and thus the detrimental effects of such shocks upon the supported electrical devices are either eliminated or greatly diminished.

The symbols +, −, G, and P, (positive, negative, grid and plate) are placed on the shell 11 so that the shell and base may be assembled in any desired relative position without the danger of suggesting incorrect electrical connections which might result in the destruction of the electrical device when inserted in the socket. When placed upon the shell member, they also enable the user to change the relative position of the parts to bring the mounting holes in the base to any desired position without rendering the markings incorrect.

Each of the contact portions 12a, 13a, etc., may be formed with small slots as at 12c, which are preferably formed by a stamping operation leaving sharpened, slightly upwardly projecting edges.

The pin contacts on vacuum tubes and other devices are often covered with solder at their ends which corrodes and forms a very poor contact with the flat contact springs in sockets as usually constructed, thus necessitating frequent cleaning of the ends of the pins. In our construction when the tube base is inserted in or rotated back and forth in the socket, the pins pass over the slots and are cleaned by the sharp edges at the slots. The successive positions taken by the pins upon insertion and rotation of the tube base, are indicated by the dotted circles in Fig. 1.

Binding posts as at 22 may be positioned at the corners of the base 10 upon the elevated portions between the recesses 21. The shock-absorbing spring portions 12b, 13b, 14b and 15b, may be conveniently fixed to the base member by means of the binding posts in the manner illustrated. Thus it will be seen that the binding posts may be directly connected to the contact members in a simple manner by way of the spring supporting extensions which thus are made to serve a double purpose.

While we have shown and described an embodiment of our invention, it is to be understood that many modifications may be made therein without departing from the spirit and scope of the appended claim, and we desire that only such limitations shall be imposed upon our invention as are specifically pointed out in the claim and such as are required by the prior art.

This application is a division of our co-pending application, Serial No. 663,031, filed September 17, 1923.

Having thus described our invention, what we claim as new and desire to secure by Letters Patent in the United States, is:

A socket for receiving an insertable device, which device has pin contacts and is inserted by a movement including a turning movement, said socket having a flat spring contact member engaged by the end of one of the pins and having a slot therein in a position traversed by the pin while the device is being turned into or out of position, said slot being of dimensions to exclude the pin therefrom, whereby the pin will be scraped by the edge of the slot but will rest against the flat spring surface when in normal contact position.

JOHN JUERGENS.
REUBEN B. BENJAMIN.